US 8,446,379 B2

(12) United States Patent
Chang et al.

(10) Patent No.: US 8,446,379 B2
(45) Date of Patent: May 21, 2013

(54) LIQUID CRYSTAL DISPLAY HAVING A SENSING UNIT AND PIXEL UNIT SHARING THE SAME DATA LINE

(75) Inventors: Yu-Shuan Chang, Hsin-Chu (TW); Hsueh-Ying Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 282 days.

(21) Appl. No.: 12/582,693

(22) Filed: Oct. 20, 2009

(65) Prior Publication Data

US 2011/0012844 A1   Jan. 20, 2011

(30) Foreign Application Priority Data

Jul. 14, 2009 (TW) .............................. 98123699 A

(51) Int. Cl.
*G06F 3/041* (2006.01)
(52) U.S. Cl.
USPC ........................................................ 345/173
(58) Field of Classification Search
USPC ............... 345/156, 173–178, 207; 178/18.05, 178/18.06, 18.09
See application file for complete search history.

(56) References Cited

U.S. PATENT DOCUMENTS

| 6,731,266 | B1 | 5/2004 | Jung | |
|---|---|---|---|---|
| 7,053,967 | B2 * | 5/2006 | Abileah et al. | 349/12 |
| 7,595,795 | B2 * | 9/2009 | Shin et al. | 345/207 |
| 2002/0041267 | A1 * | 4/2002 | Jung | 345/92 |
| 2005/0116937 | A1 * | 6/2005 | Choi et al. | 345/173 |
| 2005/0218302 | A1 | 10/2005 | Shin | |
| 2006/0170658 | A1 | 8/2006 | Nakamura et al. | |
| 2006/0262099 | A1 | 11/2006 | Destura et al. | |
| 2006/0267948 | A1 | 11/2006 | Takahashi | |
| 2007/0080921 | A1 * | 4/2007 | Wang et al. | 345/100 |

FOREIGN PATENT DOCUMENTS

| CN | 101089687 A | 12/2007 |
|---|---|---|
| CN | 101251783 A | 8/2008 |
| TW | 530287 | 5/2003 |
| TW | 200519720 | 6/2005 |
| TW | 200715261 | 4/2007 |

* cited by examiner

*Primary Examiner* — Chanh Nguyen
*Assistant Examiner* — Ram Mistry
(74) *Attorney, Agent, or Firm* — Winston Hsu; Scott Margo

(57) ABSTRACT

A liquid crystal display with sensing mechanism includes a data line, a sensing unit, a pixel unit, a first gate line, a second gate line, a source driver, a readout signal processing unit and a switch unit. The data line is used to deliver a data signal or a readout signal. The sensing unit is employed to generate the readout signal. The pixel unit functions to control pixel brightness according to the data signal. The first gate line delivers a first gate signal for controlling the sensing unit. The second gate line delivers a second gate signal for controlling the pixel unit. The source driver is utilized for providing the data signal. The readout signal processing unit performs a sensing position analysis on the readout signal received. The switch unit is put in use for connecting the data line with either the source driver or the readout signal processing unit.

18 Claims, 6 Drawing Sheets

LIQUID CRYSTAL DISPLAY HAVING A SENSING UNIT AND PIXEL UNIT SHARING THE SAME DATA LINE

BACKGROUND OF THE INVENTION

1. Field of the Invention

The present invention relates to a liquid crystal display, and more particularly, to a liquid crystal display with sensing mechanism and sense positioning method thereof.

2. Description of the Prior Art

Along with the advantages of thin appearance, low power consumption and low radiation, liquid crystal displays have been widely applied in various electronic products such as multimedia playbacks, mobile phones, personal digital assistants (PDAs), computer monitors, or flat panel televisions. In addition, liquid crystal displays capable of performing input operations based on photo-sensing or touch-sensing mechanism are more and more popular. That is, the liquid crystal display with sensing mechanism is applied to more and more electronic appliances for providing a friendly input interface as well as for displaying.

FIG. 1 is a structural diagram schematically showing a prior-art liquid crystal display with sensing mechanism. As shown in FIG. 1, the liquid crystal display 100 comprises a source driver 110, a gamma voltage generator 105, a gate driver 120, a readout circuit 195, and an image display area 190. The image display area 190 includes a plurality of data lines 130, a plurality of readout lines 140, a plurality of gate lines 150, a plurality of pixel units 160, and a plurality of sensing units 170. The source driver 110 includes a plurality of digital/analogy converters 115 for converting digital image data into a plurality of data signals based on plural gamma voltages provided by the gamma voltage generator 105. The data signals are written into the pixel units 160 via the data lines 130 so that each pixel unit 160 is capable of controlling pixel brightness according to one corresponding data signal received. The gate driver 120 is utilized for providing plural gate signals furnished to the pixel units 160 and the sensing units 170 via the gate lines 150. The sensing units 170 perform sensing operations for generating plural readout signals delivered to the readout circuit 195 via the readout lines 140. However, in the structure of the liquid crystal display 100, the aperture ratio of each pixel unit 160 is lowered due to the arrangement of the readout lines 140. Besides, the data signals of the data lines 130 are interfered by the transmission of the readout signals in the readout lines 140. In view of that, the analog voltages of the data signals are likely to drift around, which in turn degrades image display quality.

SUMMARY OF THE INVENTION

In accordance with one embodiment of the present invention, a liquid crystal display with sensing mechanism is disclosed. The liquid crystal display comprises a data line, a sensing unit, a pixel unit, a first gate line, a second gate line, a source driver, a readout signal processing unit, and a switch unit. The data line is employed to deliver a data signal or a readout signal. The sensing unit is electrically connected to the data line for outputting the readout signal. The pixel unit is electrically connected to the data line for receiving the data signal. The first gate line, electrically connected to the sensing unit, is utilized for delivering a first gate signal employed to control the sensing unit. The second gate line, electrically connected to the pixel unit, is utilized for delivering a second gate signal employed to control the pixel unit. The source driver functions to provide the data signal. The readout signal processing unit is used to perform a signal processing operation on the readout signal. The switch unit comprises a first end electrically connected to the source driver, a second end electrically connected to the readout signal processing unit, and a third end electrically connected to the data line. The switch unit is employed to electrically connect the third end with either the first end or the second end.

In accordance with another embodiment of the present invention, a sense positioning method is disclosed for use in a liquid crystal display. The liquid crystal display includes a data line, a first gate line, a second gate line, a sensing unit electrically connected to the data line and the first gate line, a pixel unit electrically connected to the data line and the second gate line, a source driver, a readout signal processing unit, and a switch unit. The switch unit comprises a first end electrically connected to the source driver, a second end electrically connected to the readout signal processing unit, and a third end electrically connected to the data line. The sense positioning method comprises: the switch unit electrically connecting the second and third ends for electrically connecting the readout signal processing unit with the data line during a first interval; the first gate line delivering a first gate signal for enabling the sensing unit to output a readout signal to the readout signal processing unit during the first interval; the switch unit electrically connecting the first and third ends for electrically connecting the source driver with the data line during a second interval; the second gate line delivering a second gate signal for enabling the pixel unit to receive a data signal outputted from the source driver during the second interval; and the readout signal processing unit performing a sensing position analysis on the readout signal during a third interval; wherein the first interval and the second interval are not overlapped to each other.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers regarding the sense positioning method are not meant thereto limit the operating sequence, and any rearrangement of the operating sequence for achieving same functionality is still within the spirit and scope of the invention.

Figure 1:
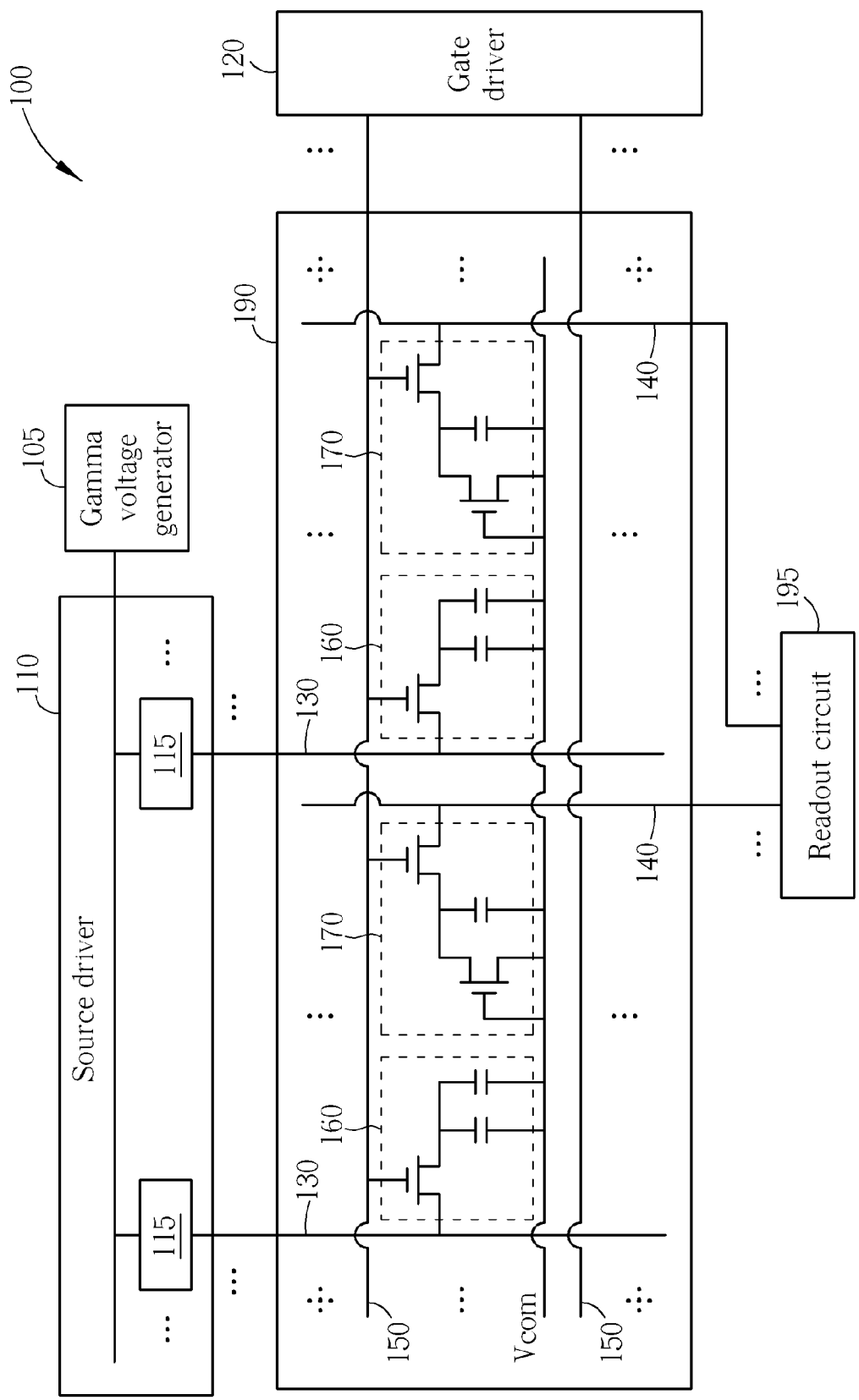
FIG. 1 is a structural diagram schematically showing a prior-art liquid crystal display with sensing mechanism.
Figure 2:
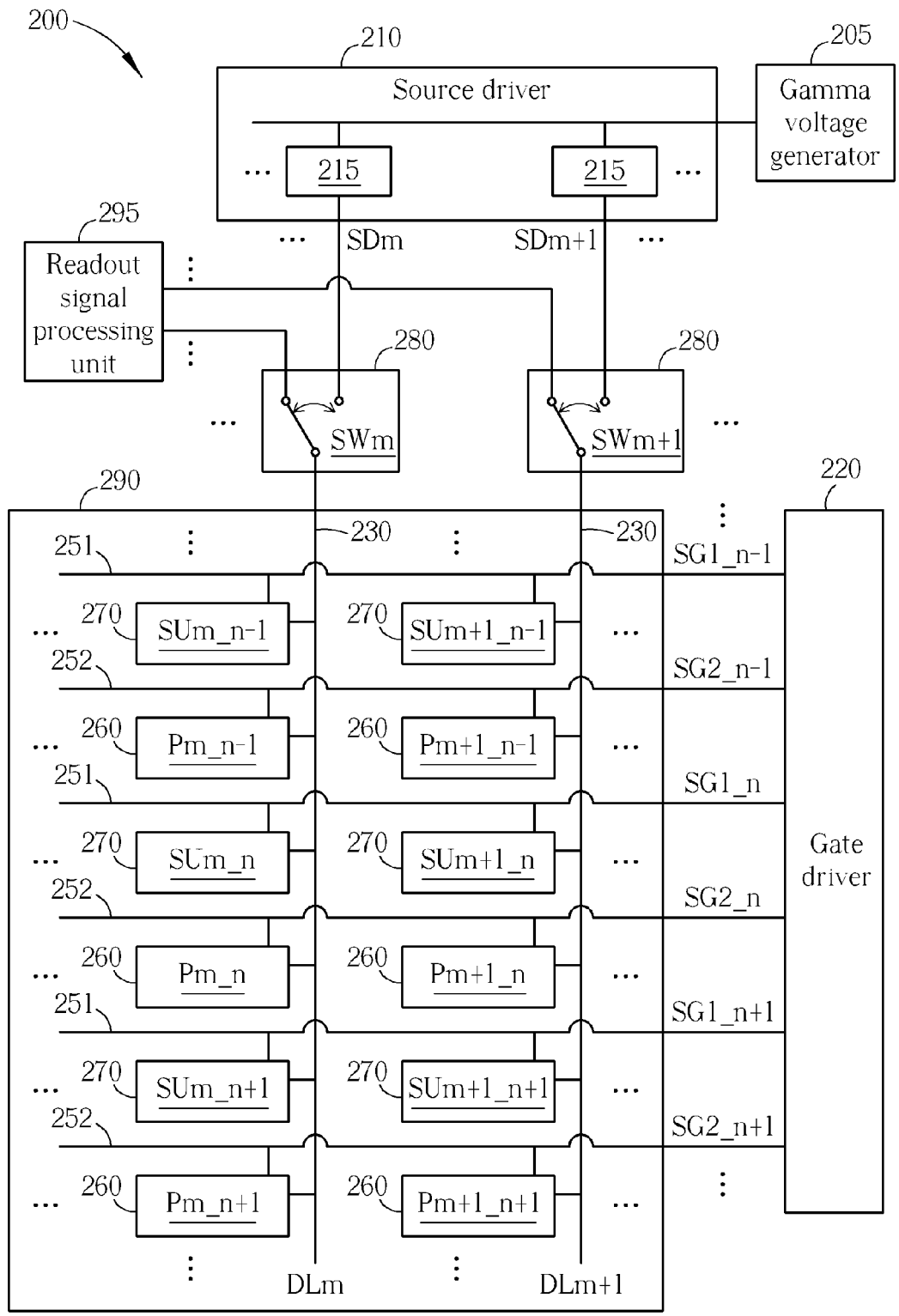
FIG. 2 is a structural diagram schematically showing a liquid crystal display in accordance with a first embodiment of the present invention.

FIG. 2 is a structural diagram schematically showing a liquid crystal display in accordance with a first embodiment of the present invention. As shown in FIG. 2, the liquid crystal display 200 comprises a source driver 210, a gamma voltage generator 205, a gate driver 220, a readout signal processing unit 295, a plurality of switch units 280, and an image display area 290. The image display area 290 includes a plurality of data lines 230, a plurality of first gate lines 251, a plurality of second gate lines 252, a plurality of pixel units 260, and a plurality of sensing units 270. The gate driver 220, electrically connected to the first gate lines 251 and the second gate lines 252, is put in use for providing a plurality of first gate signals furnished to the sensing units 270 via the first gate lines 251 and for providing a plurality of second gate signals furnished to the pixel units 260 via the second gate lines 252. The source driver 210 includes a plurality of digital/analogy converters 215 for converting digital image data into a plurality of data signals based on plural gamma voltages provided by the gamma voltage generator 205. The data signals are written into the pixel units 260 via the data lines 230 so that each pixel unit 260 is capable of controlling pixel brightness according to one corresponding data signal received. The sensing units 270 perform sensing operations for generating plural readout signals delivered to the readout signal processing unit 295 via the data lines 230. In one embodiment, the readout signal processing unit 295 fetches each readout signal through detecting charging current furnished to one corresponding sensing unit 270.

The readout signal processing unit 295 performs a sensing position analysis on the readout signals received for positioning a sensing position. Each switch unit 280 is employed to electrically connect one data line 230 with either the readout signal processing unit 295 or the source driver 210. For instance, when the switch unit SWm electrically connects the data line DLm with the readout signal processing unit 295 and the first gate signal SG1_n is an enable signal, the readout signal generated by the sensing unit SUm_n can be delivered to the readout signal processing unit 295 via the data line DLm and the switch unit SWm. Accordingly, the readout signal processing unit 295 is able to perform a sensing position analysis on the readout signal for determining whether a sensing event is occurring to a panel position corresponding to the sensing unit SUm_n. Regarding another operating situation, when the switch unit SWm+1 electrically connects the data line DLm+1 with the source driver 210 and the second gate signal SG2_n is an enable signal, the data signal outputted from one corresponding digital/analog converter 215 of the source driver 210 can be written into the pixel unit Pm+1_n via the switch unit SWm+1 and the data line DLm+1. In the embodiment shown in FIG. 2, each switch unit 280 comprises a first end electrically connected to the source driver 210, a second end electrically connected to the readout signal processing unit 295, and a third end electrically connected to one data line 230. And the switch unit 280 is therefore used to connect the third end with either the first end or the second end.

In another embodiment, two successive sensing units 270 are spaced out at least two data lines 230 or at least two second gate lines 252. That is, only parts of the pixel units 260 are neighboring the sensing units 270. Similarly, two successive first gate lines 251 can be spaced out at least two second gate lines 252 accordingly. To sum up, in the circuit structure of the liquid crystal display 200, the readout signal of each sensing unit 270 is delivered to the readout signal processing unit 295 via one corresponding data line 230 instead of a readout line in the prior-art, i.e. no readout line is required to be disposed in the liquid crystal display 200. And therefore the aperture ratio of the liquid crystal display 200 is greater than that of the prior-art liquid crystal display disposed with readout lines. Furthermore, since the readout signal and the data signal are not delivered concurrently, the transmission of the readout signal has no effect on the analog voltage of the data signal.

Figure 3:
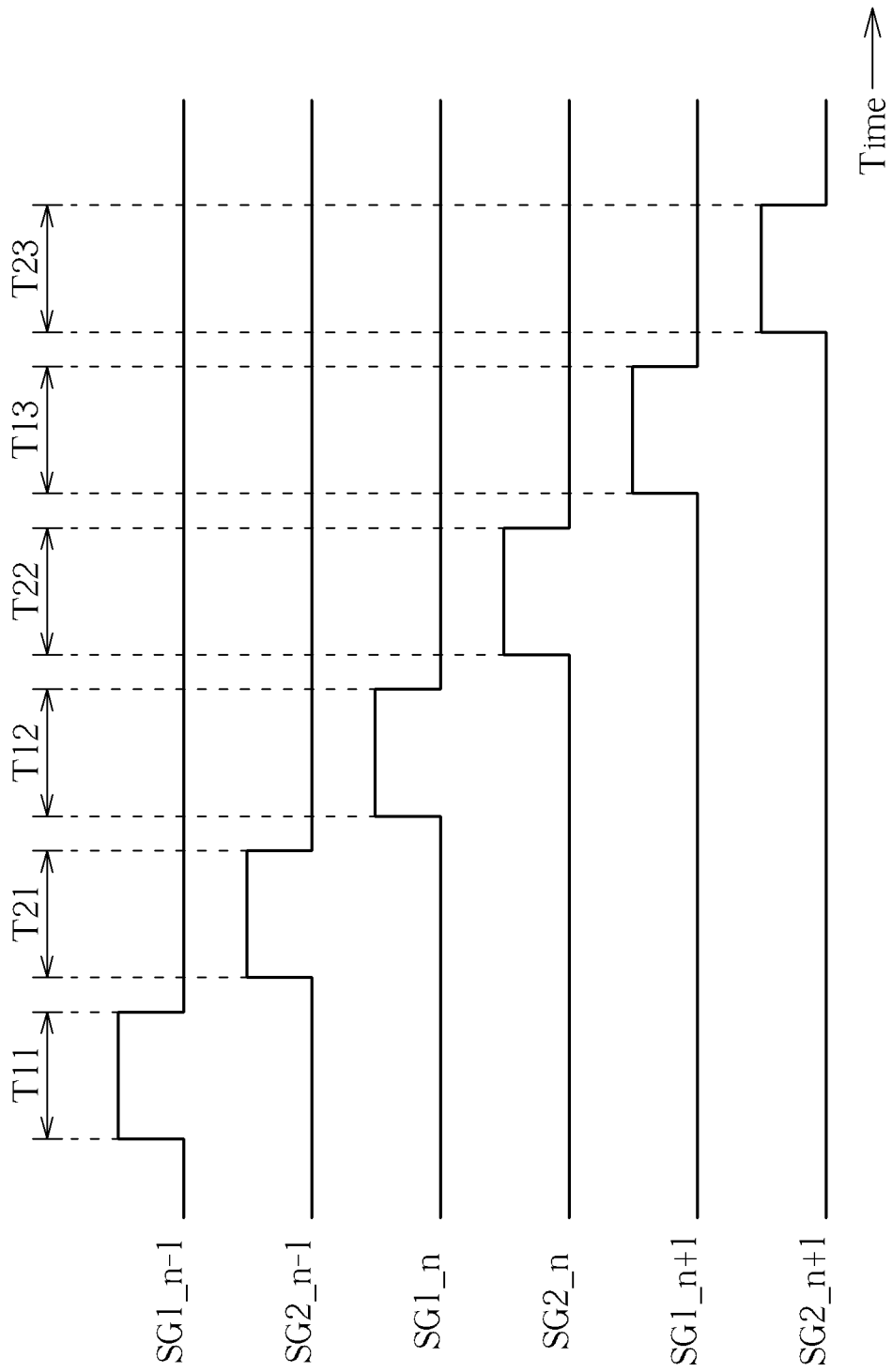
FIG. 3 is a schematic diagram showing related signal waveforms regarding the operation of the liquid crystal display in FIG. 2, having time along the abscissa.

FIG. 3 is a schematic diagram showing related signal waveforms regarding the operation of the liquid crystal display in FIG. 2, having time along the abscissa. The signal waveforms in FIG. 3, from top to bottom, are the first gate signal SG1_n−1, the second gate signal SG2_n−1, the first gate signal SG1_n, the second gate signal SG2_n, the first gate signal SG1_n+1, and the second gate signal SG2_n+1. As shown in FIG. 3, during a first interval T11, the first gate signal SG1_n−1 is an enable signal having high voltage level for enabling the sensing units SUm_n−1, SUm+1_n−1 to output corresponding readout signals. Meanwhile, the switch unit SWm electrically connects the data line DLm with the readout signal processing unit 295, and the switch unit SWm+1 electrically connects the data line DLm+1 with the readout signal processing unit 295. For that reason, the readout signal generated by the sensing unit SUm_n−1 can be delivered to the readout signal processing unit 295 via the data line DLm and the switch unit SWm, and the readout signal generated by the sensing unit SUm+1_n−1 can be delivered to the readout signal processing unit 295 via the data line DLm+1 and the switch unit SWm+1. Accordingly, the readout signal processing unit 295 is able to perform a sensing position analysis on the readout signals from the sensing units SUm_n−1, SUm+1_n−1.

During a second interval T21, the second gate signal SG2_n−1 is an enable signal having high voltage level for enabling the pixel units Pm_n−1, Pm+1_n−1 to receive corresponding data signals. Meanwhile, the switch unit SWm electrically connects the data line DLm with the source driver 210, and the switch unit SWm+1 electrically connects the data line DLm+1 with the source driver 210. Hence the data signal SDm outputted from the source driver 210 can be written into the pixel unit Pm_n−1 via the switch unit SWm and the data line DLm, and the data signal SDm+1 outputted from the source driver 210 can be written into the pixel unit Pm+1_n−1 via the switch unit SWm+1 and the data line DLm+1. Then the pixel units Pm_n−1, Pm+1_n−1 are able to control corresponding pixel brightness accordingly. During an intermediate interval between the first interval T11 and the second interval T21, all the gate signals are disable signals and each data line 230 can be pre-charged to one corresponding pixel voltage.

During a first interval T12, the first gate signal SG1_n is an enable signal having high voltage level for enabling the sensing units SUm_n, SUm+1_n to output corresponding readout signals. Meanwhile, the switch unit SWm electrically connects the data line DLm with the readout signal processing unit 295, and the switch unit SWm+1 electrically connects the data line DLm+1 with the readout signal processing unit 295. For that reason, the readout signal generated by the sensing unit SUm_n can be delivered to the readout signal processing unit 295 via the data line DLm and the switch unit SWm, and the readout signal generated by the sensing unit SUm+1_n can be delivered to the readout signal processing unit 295 via the data line DLm+1 and the switch unit SWm+1. Accordingly, the readout signal processing unit 295 is able to perform a sensing position analysis on the readout signals from the sensing units SUm_n, SUm+1_n. During an intermediate interval between the second interval T21 and the first interval T12, all the gate signals are disable signals and all the data lines 230 can be pre-charged to a reset voltage required by the sensing units 270.

During a second interval T22, the second gate signal SG2_n is an enable signal having high voltage level for enabling the pixel units Pm_n, Pm+1_n to receive corresponding data signals. Meanwhile, the switch unit SWm electrically connects the data line DLm with the source driver 210, and the switch unit SWm+1 electrically connects the data line DLm+1 with the source driver 210. Hence the data signal SDm outputted from the source driver 210 can be written into the pixel unit Pm_n via the switch unit SWm and the data line DLm, and the data signal SDm+1 outputted from the source driver 210 can be written into the pixel unit Pm+1_n via the switch unit SWm+1 and the data line DLm+1. Then the pixel units Pm_n, Pm+1_n are able to control corresponding pixel brightness accordingly. Similarly, during an intermediate interval between the first interval T12 and the second interval T22, all the gate signals are disable signals and each data line 230 can be pre-charged to one corresponding pixel voltage. Regarding a first interval T13, a second interval T23 and other intermediate intervals, the circuit operations of the liquid crystal display 200 can be inferred by analogy and, for the sake of brevity, further similar discussion thereof is omitted. It is noted that the readout signal processing unit 295 is able to perform a sensing position analysis immediately after the readout signals are fetched during each first interval, and therefore the interval for performing the sensing position analysis may partly overlap the first, second or intermediate interval.

Figure 4:
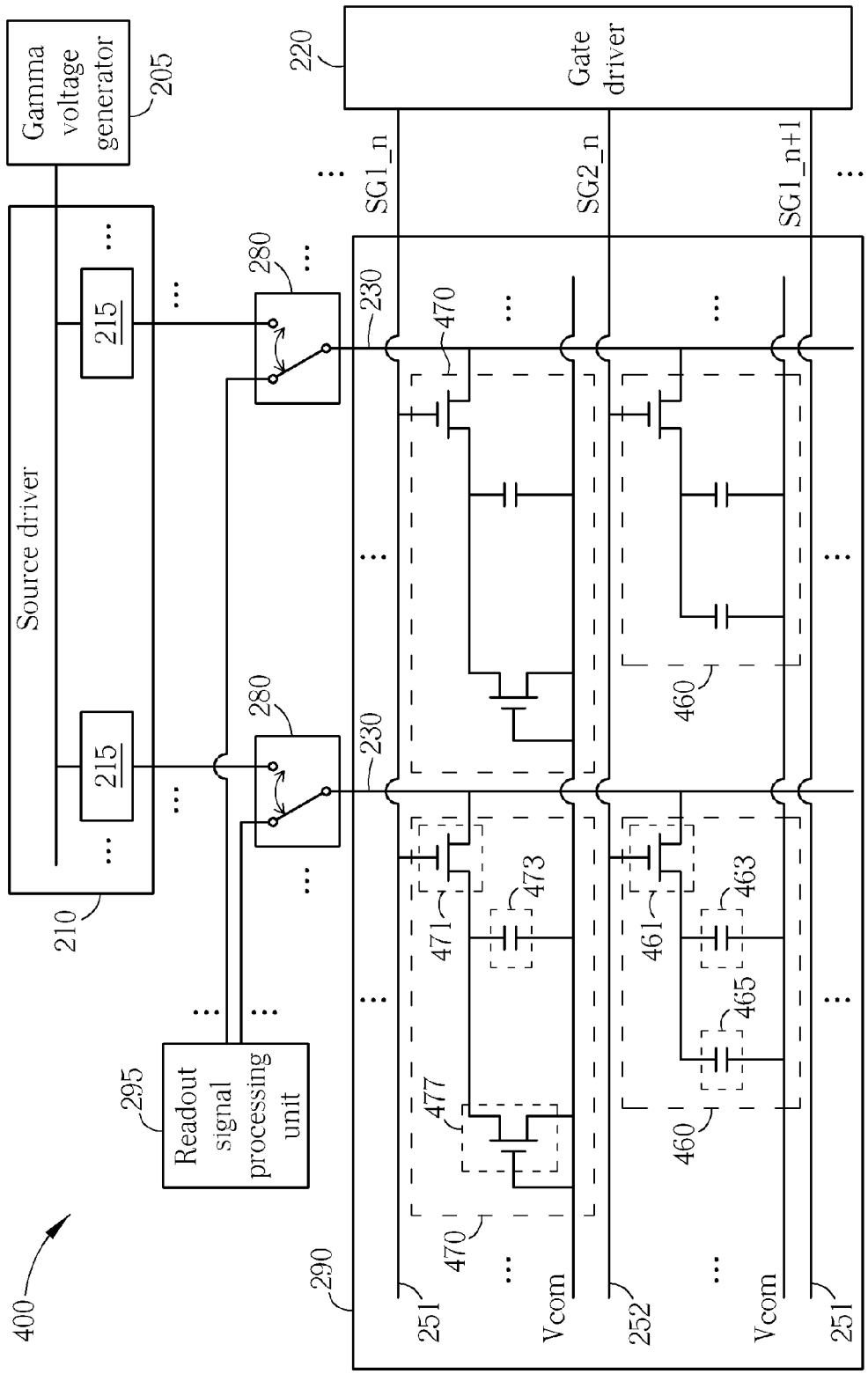
FIG. 4 is a structural diagram schematically showing a liquid crystal display in accordance with a second embodiment of the present invention.

FIG. 4 is a structural diagram schematically showing a liquid crystal display in accordance with a second embodiment of the present invention. As shown in FIG. 4, the liquid crystal display 400 is similar to the liquid crystal display 200 shown in FIG. 2, differing in that the pixel units 260 and the sensing units 270 are replaced with plural pixel units 460 and plural sensing units 470 respectively. In the embodiment shown in FIG. 4, each sensing unit 470 comprises a readout transistor 471, a first storage capacitor 473 and a sensing transistor 477. The readout transistor 471 can be a thin film transistor (TFT) or a metal oxide semiconductor (MOS) field effect transistor. The sensing transistor 477 can be a photo-sensing thin film transistor. Each pixel unit 460 comprises a data switch 461, a liquid crystal capacitor 463 and a second storage capacitor 465. The data switch 461 can be a thin film transistor or an MOS field effect transistor.

The readout transistor 471 comprises a first end electrically connected to the data line 230, a gate end electrically connected to the first gate line 251, and a second end. The first storage capacitor 473 comprises a first end electrically connected to the second end of the readout transistor 471 and a second end for receiving a common voltage Vcom. The sensing transistor 477 comprises a first end electrically connected to the second end of the readout transistor 471, a second end for receiving the common voltage Vcom, and a gate end for receiving the common voltage Vcom. The data switch 461 comprises a first end electrically connected to the data line 230, a gate end electrically connected to the second gate line 252, and a second end. The liquid crystal capacitor 463 comprises a first end electrically connected to the second end of the data switch 461 and a second end for receiving the common voltage Vcom. The second storage capacitor 465 comprises a first end electrically connected to the second end of the data switch 461 and a second end for receiving the common voltage Vcom.

Figure 5:
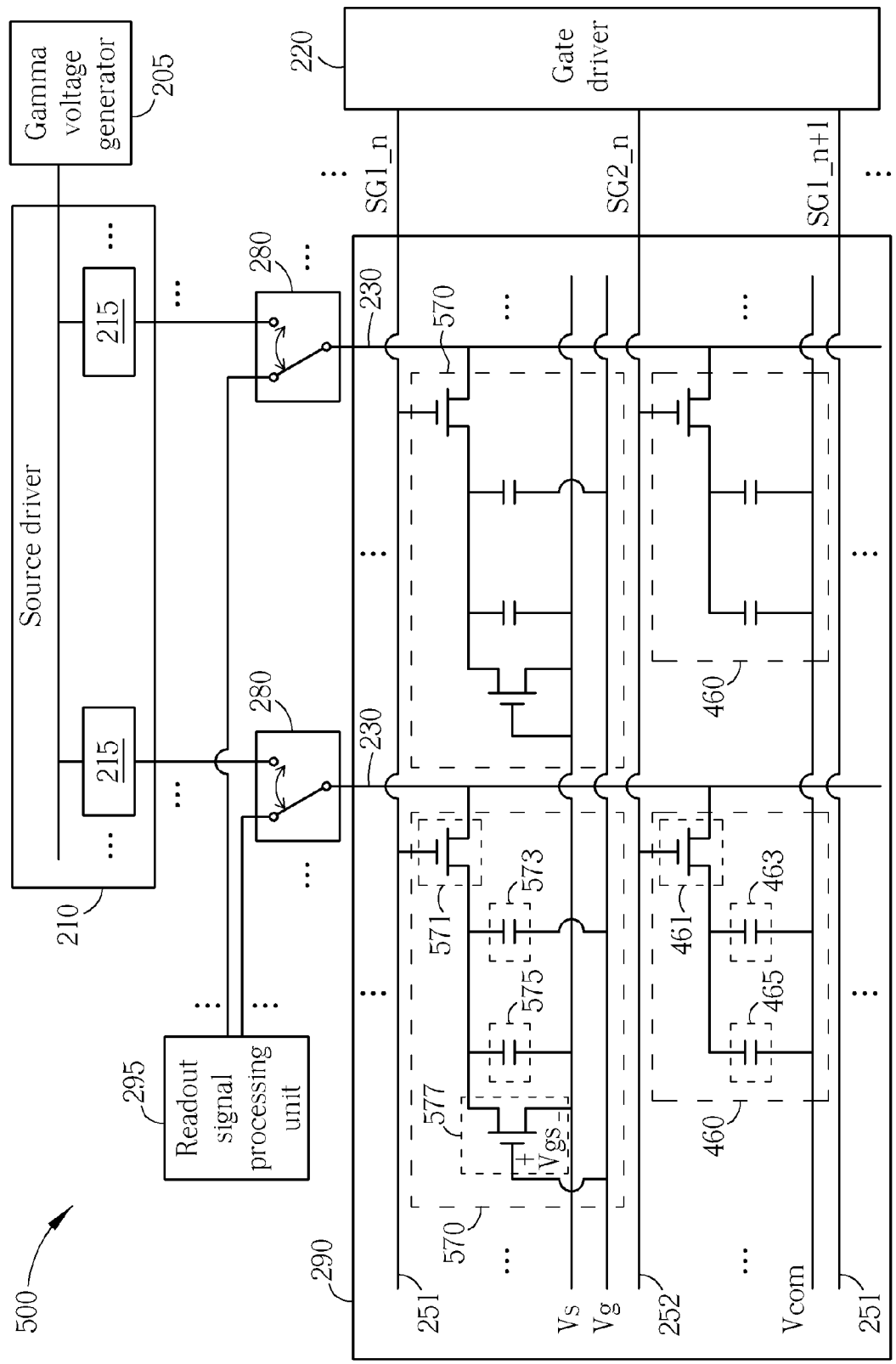
FIG. 5 is a structural diagram schematically showing a liquid crystal display in accordance with a third embodiment of the present invention.

FIG. 5 is a structural diagram schematically showing a liquid crystal display in accordance with a third embodiment of the present invention. As shown in FIG. 5, the liquid crystal display 500 is similar to the liquid crystal display 400 shown in FIG. 4, differing in that the sensing units 470 are replaced with plural sensing units 570. In the embodiment shown in FIG. 5, each sensing unit 570 comprises a readout transistor 571, a first storage capacitor 573, a third storage capacitor 575 and a sensing transistor 577. The readout transistor 571 can be a thin film transistor or an MOS field effect transistor. The sensing transistor 577 can be a photo-sensing thin film transistor.

The readout transistor 571 comprises a first end electrically connected to the data line 230, a gate end electrically connected to the first gate line 251, and a second end. The first storage capacitor 573 comprises a first end electrically connected to the second end of the readout transistor 571 and a second end for receiving a first bias voltage Vg. The sensing transistor 577 comprises a first end electrically connected to the second end of the readout transistor 571, a gate end for receiving the first bias voltage Vg, and a second end for receiving a second bias voltage Vs. The third storage capacitor 575 is electrically connected between the first and second ends of the sensing transistor 577. The first bias voltage Vg and the second bias voltage Vs can be employed to provide the gate-source voltage drop Vgs of the sensing transistor 577. Accordingly, the leakage current flowing through the sensing transistor 577 can be adjusted to control the discharging speed of the first storage capacitor 573 and the third storage capacitor 575. In one embodiment, the first bias voltage Vg can be the common voltage Vcom and the gate-source voltage drop Vgs is adjusted mainly based on the second bias voltage Vs. In another embodiment, the second bias voltage Vs can be the common voltage Vcom and the gate-source voltage drop Vgs is adjusted mainly based on the first bias voltage Vg.

Figure 6:
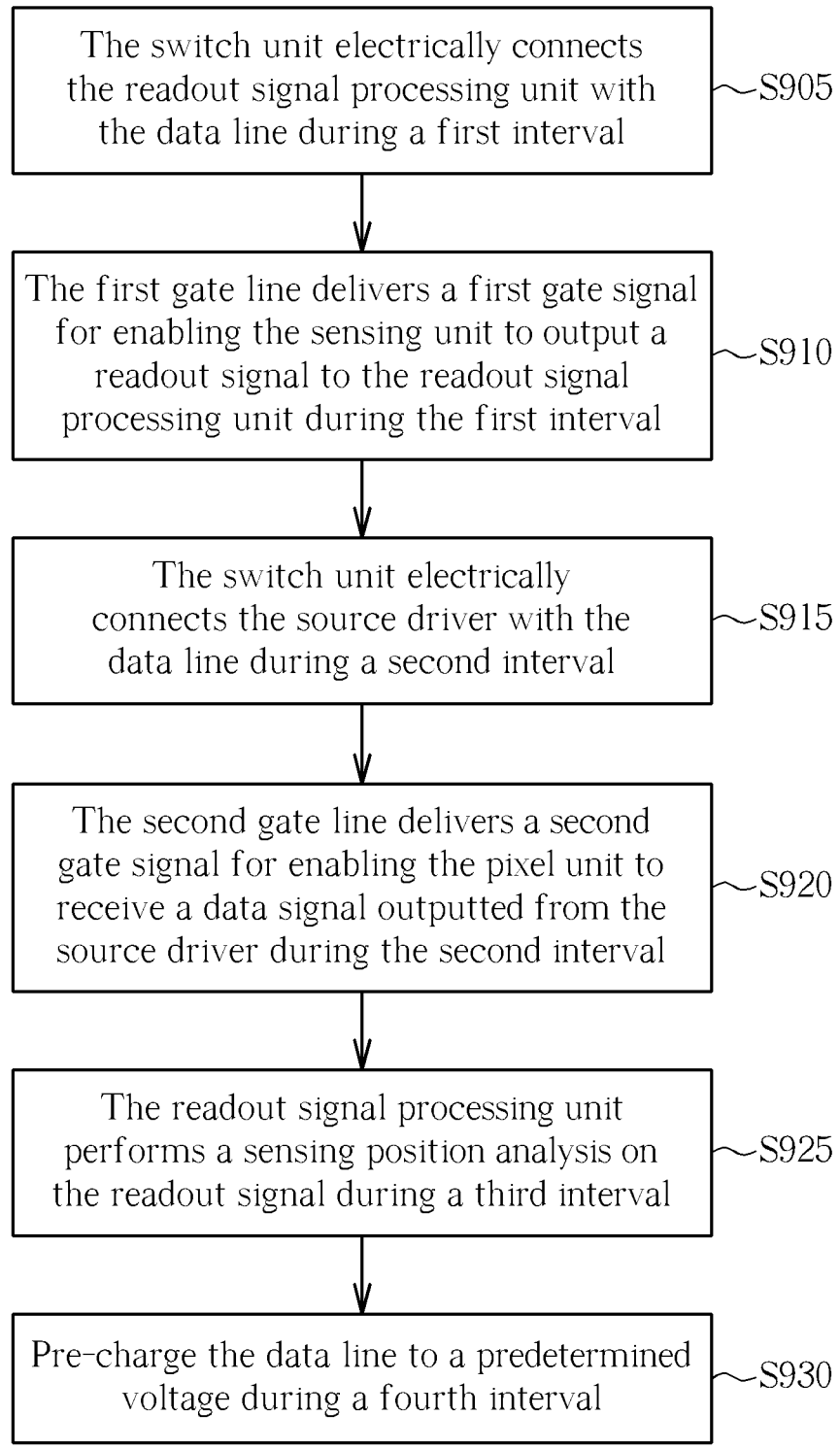
FIG. 6 is a flowchart depicting a sense positioning method for use in the liquid crystal display shown in FIG. 2 according to the present invention.

FIG. 6 is a flowchart depicting a sense positioning method for use in the liquid crystal display shown in FIG. 2 according to the present invention. As shown in FIG. 6, the flow 900 of the sense positioning method comprises the following steps:

Step S905: The switch unit 280 electrically connects the readout signal processing unit 295 with the data line 230 during a first interval.

Step S910: The first gate line 251 delivers a first gate signal for enabling the sensing unit 270 to output a readout signal to the readout signal processing unit 295 during the first interval.

Step S915: The switch unit 280 electrically connects the source driver 210 with the data line 230 during a second interval.

Step S920: The second gate line 252 delivers a second gate signal for enabling the pixel unit 260 to receive a data signal outputted from the source driver 210 during the second interval.

Step S925: The readout signal processing unit 295 performs a sensing position analysis on the readout signal during a third interval.

Step S930: Pre-charge the data line 230 to a predetermined voltage during a fourth interval.

In the flow 900 of the sense positioning method, the first interval, the second interval and the fourth interval are not overlapped to each other. The first interval is prior to or after the second interval. The fourth interval is after the second or first interval. In one embodiment, the predetermined voltage is a reset voltage required for charging the storage capacitor of the sensing units 270. In another embodiment, the predetermined voltage is a pixel voltage required for charging the pixel capacitor, such as the liquid crystal capacitor and the storage capacitor, of the pixel unit 260. The third interval may partly overlap the first, second or fourth interval. The duration of the first interval can be identical to or different from that of the second interval. The duration of the first interval can be determined according to the allowable charging time or the allowable voltage range regarding the storage capacitor of the sensing unit 270. The duration of the second interval can be determined according to the allowable charging time or the allowable voltage range regarding the pixel capacitor of the pixel unit 260.

In conclusion, regarding the circuit structure of the liquid crystal display according to the present invention, the readout signal of each sensing unit is delivered by one corresponding data line instead of a readout line in the prior-art, i.e. no readout line is required to be disposed in the liquid crystal display of the present invention. And therefore the aperture ratio of the liquid crystal display of the present invention is greater than that of the prior-art liquid crystal display disposed with readout lines. Furthermore, regarding the corresponding sense positioning method, the interval for delivering the readout signal and the interval for delivering the data signal are not overlapped, and therefore the transmission of the readout signal has no effect on the analog voltage of the data signal.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display, comprising:
   a data line for delivering a data signal or a readout signal;
   a sensing unit directly connected to the data line for outputting the readout signal,
     the sensing unit comprising:
       a readout transistor comprising a first end directly connected to the data line, a gate end directly connected to a first gate line, and a second end;
       a first storage capacitor comprising a first end directly connected to the second end of the readout transistor and a second end for receiving a first bias voltage;
       a sensing transistor comprising a first end directly connected to the second end of the readout transistor, a gate end for receiving the first bias voltage, and a second end for receiving a second bias voltage; and
       a second storage capacitor directly connected between the first and second ends of the sensing transistor;
   a pixel unit directly connected to the data line for receiving the data signal;
   the first gate line, directly connected to the sensing unit, for delivering a first gate signal employed to control the sensing unit;
   a second gate line, directly connected to the pixel unit, for delivering a second gate signal employed to control the pixel unit;
   a source driver for providing the data signal;
   a readout signal processing unit for performing a signal processing operation on the readout signal; and
   a switch unit comprising a first end directly connected to the source driver, a second end directly connected to the readout signal processing unit, and a third end directly connected to the data line, the switch unit being employed to directly connect the third end with either the first end or the second end.

2. The liquid crystal display of claim 1, wherein the sensing unit comprises:
   a readout transistor comprising a first end electrically connected to the data line, a gate end electrically connected to the first gate line, and a second end;
   a storage capacitor comprising a first end electrically connected to the second end of the readout transistor and a second end for receiving a common voltage; and
   a sensing transistor comprising a first end electrically connected to the second end of the readout transistor, a gate end for receiving the common voltage, and a second end for receiving the common voltage.

3. The liquid crystal display of claim 2, wherein the readout transistor is a thin film transistor or a metal oxide semiconductor (MOS) field effect transistor.

4. The liquid crystal display of claim 2, wherein the sensing transistor is a photo-sensing thin film transistor.

5. The liquid crystal display of claim 1, wherein the readout transistor is a thin film transistor or an MOS field effect transistor.

6. The liquid crystal display of claim 1, wherein the sensing transistor is a photo-sensing thin film transistor.

7. The liquid crystal display of claim 1, wherein the first bias voltage is a common voltage.

8. The liquid crystal display of claim 1, wherein the second bias voltage is a common voltage.

9. The liquid crystal display of claim 1, wherein the pixel unit comprises:
   a data switch comprising a first end electrically connected to the data line, a gate end electrically connected to the second gate line, and a second end;
   a liquid crystal capacitor comprising a first end electrically connected to the second end of the data switch and a second end for receiving a common voltage; and
   a storage capacitor comprising a first end electrically connected to the second end of the data switch and a second end for receiving the common voltage.

10. The liquid crystal display of claim 9, wherein the data switch is a thin film transistor or an MOS field effect transistor.

11. The liquid crystal display of claim 1, further comprising:
    a gate driver, electrically connected to the first gate line and the second gate line, for providing the first gate signal and the second gate signal.

12. A sense positioning method, comprising:
    providing a liquid crystal display, the liquid crystal display comprising:
      a data line;
      a first gate line;
      a second gate line;
      a sensing unit directly connected to the data line and the first gate line, the sensing unit comprising:
        a readout transistor comprising a first end directly connected to the data line, a gate end directly connected to the first gate line, and a second end;
        a first storage capacitor comprising a first end directly connected to the second end of the readout transistor and a second end for receiving a first bias voltage;
        a sensing transistor comprising a first end directly connected to the second end of the readout transistor, a gate end for receiving the first bias voltage, and a second end for receiving a second bias voltage; and a second storage capacitor directly connected between the first and second ends of the sensing transistor;

a pixel unit directly connected to the data line and the second gate line;

a source driver;

a readout signal processing unit; and a switch unit comprising a first end directly connected to the source driver, a second end directly connected to the readout signal processing unit, and a third end directly connected to the data line;

the switch unit directly connecting the second and third ends for electrically connecting the readout signal processing unit with the data line during a first interval;

the first gate line delivering a first gate signal for enabling the sensing unit to output a readout signal to the readout signal processing unit during the first interval;

the switch unit directly connecting the first and third ends for electrically connecting the source driver with the data line during a second interval;

the second gate line delivering a second gate signal for enabling the pixel unit to receive a data signal outputted from the source driver during the second interval; and the readout signal processing unit performing a sensing position analysis on the readout signal during a third interval;

wherein the first interval and the second interval are not overlapped to each other.

13. The sense positioning method of claim 12, wherein the first interval is prior to or after the second interval.

14. The sense positioning method of claim 12, wherein the third interval partly overlaps the first interval or the second interval.

15. The sense positioning method of claim 12, wherein a duration of the first interval is identical to or different from a duration of the second interval.

16. The sense positioning method of claim 12, further comprising:
   determining a duration of the first interval according to an allowable charging time or an allowable voltage range regarding a storage capacitor of the sensing unit.

17. The sense positioning method of claim 12, further comprising:
   determining a duration of the second interval according to an allowable charging time or an allowable voltage range regarding a pixel capacitor of the pixel unit.

18. The sense positioning method of claim 12, further comprising:
   pre-charging the data line to a predetermined voltage during a fourth interval;
   wherein the fourth interval, the first interval and the second interval are not overlapped to each other.

* * * * *